United States Patent [19]

Matsuhashi et al.

[11] Patent Number: 5,387,026
[45] Date of Patent: Feb. 7, 1995

[54] SUPPORT STRUCTURE FOR ACOUSTIC OSCILLATION TRANSFERRING DEVICE

[75] Inventors: Kazuhiro Matsuhashi, Hiroshima; Koji Takada, Otake; Yoshikazu Okamoto, Hiroshima, all of Japan

[73] Assignee: Mazda Motor Corporation, Hiroshima, Japan

[21] Appl. No.: 82,573

[22] Filed: Jun. 28, 1993

[30] Foreign Application Priority Data

Jul. 10, 1992 [JP] Japan .................. 4-183568

[51] Int. Cl.$^6$ ................................ A47C 7/62
[52] U.S. Cl. .................................. 297/217.4
[58] Field of Search ............... 297/217, 191; 5/904, 5/915

[56] References Cited

U.S. PATENT DOCUMENTS

| 4,064,376 | 12/1977 | Yamada | 297/217 |
|---|---|---|---|
| 4,979,777 | 12/1990 | Takada | 297/217 |
| 5,143,055 | 9/1992 | Eakin | 297/217 |
| 5,213,392 | 5/1993 | Bostrom et al. | 297/217 |

FOREIGN PATENT DOCUMENTS 58-189681 12/1983 Japan.

Primary Examiner—John T. Kwon
Attorney, Agent, or Firm—Keck, Mahin & Cate

[57] ABSTRACT

A support structure for supporting an acoustic oscillation transferring device has a cushion forming a part of an automobile's seat and having an open space therein in which a frame of the device is supported, and an unstretchable but flexible band material for securing a frame of the device to a frame of the automobile's seat.

10 Claims, 6 Drawing Sheets

SUPPORT STRUCTURE FOR ACOUSTIC OSCILLATION TRANSFERRING DEVICE

FIELD OF THE INVENTION

The invention relates to a support structure for an acoustic oscillation transferring device which transfers acoustic oscillation produced by an acoustically oscillating equipment such as an audio speaker equipped in an automobile to a passenger's seat in the automobile.

BACKGROUND OF THE INVENTION

Recently automobiles have been provided with a system in which an acoustic oscillation transferring device in addition to an acoustically oscillating equipment such as a speaker is varied in a passenger's seat to transfer acoustic oscillation produced by the acoustically oscillating equipment to the seat so that the passenger can feel music through his or her body.

For instance, Japanese Pre-Examination Publication (Kokai) No. 58-189681 published on Dec. 16, 1983 discloses a support system for supporting an acoustic oscillation transferring device. In this system, a cushion pad as an acoustic oscillation transferring device having a speaker contained therein as an acoustically oscillating equipment is varied in a backrest portion or a seat portion of a passenger's seat.

Since the acoustic oscillation transferring device has a certain amount of mass, it receives inertia force when an automobile in which the acoustic oscillation transferring device is equipped comes into collision. Accordingly the acoustic oscillation transferring device displaces a lot together with a cushion material of the passenger's seat when great shock caused by collision exerts on the automobile.

In the support system disclosed in the aforementioned Publication, the cushion pad in which the acoustically oscillating equipment and the acoustic oscillation transferring device are varied is secured to a frame of the passenger's seat through a spring. Since the spring extends in some degree on receipt of the collision force, the cushion pad together with the equipment may displace a lot.

If an acoustically oscillating equipment and an acoustic oscillation transferring device are fixed to a frame of a passenger's seat, the displacement of these can be avoided. However, the fixing of the equipment and device results in that acoustic oscillation cannot transfer well to a passenger's seat and thus the primary object is spoiled for a passenger to feel music through its body.

SUMMARY OF THE INVENTION

It is an object of the present invention to provide a support structure for supporting an acoustic oscillation transferring device so that acoustic oscillation can be efficiently transferred to a passenger's seat while an acoustically oscillating equipment and an acoustic oscillation transferring device can be stably supported.

The invention provides a support structure for an acoustic oscillation transferring device including, a cushion forming a part of an automobile's seat and having an open space therein in which a frame of the acoustic oscillation transferring device is supported, and an unstretchable but flexible band material for securing the frame of the acoustic oscillation transferring device to a frame of the automobile's seat.

In a preferred embodiment, the cushion includes a pair of cushions forming a backrest portion of the seat and being kept in close contact with each other longitudinally of the automobile.

In another preferred embodiment, the frame of the acoustic oscillation transferring device is supported between the pair of cushions.

In still another preferred embodiment, the band material is made of woven yarn of synthetic fibers.

In yet another preferred embodiment, the band material is secured at its opposite ends to the automobile's frame so that the band material forms a loop which winds around the frame of the acoustic oscillation transferring device.

In still yet another embodiment, the loop is sized so that one of the pair of cushions is disposed adjacent to the other or quite slightly spaced away from the other, even if the one of the pair of cushions moves away from the other.

In further preferred embodiment, the oscillation transferring device is disposed at the side of a driver's back.

In another aspect of the invention, there is provided a support structure for an acoustic oscillation transferring device including a cushion forming a part of a automobile's seat and having a front cushion and a rear cushion which can be separated longitudinally of the automobile. The acoustic oscillation transferring device is secured to the front cushion. The support structure also includes an unstretchable but flexible band material for securing the acoustic oscillation transferring device to a frame of the automobile's seat. Thus, the acoustic oscillation transferring device is restricted in forward movement.

The advantages obtained by the aforementioned support structure will be described hereinbelow.

A frame of the acoustic oscillation transferring device is secured to a frame of a passenger's seat through the band material. The band material is flexible, but not stretchable. Accordingly, when collision force exerts on the acoustic oscillation transferring device to displace the device apart from the frame of the seat, the device is restricted in its forward movement. Thus, the device does never or scarcely move.

In addition, since the band material is flexible, the acoustic oscillation transferring device is not fixed to the passenger's seat and therefore acoustic oscillation is not interrupted to transfer to the passenger's seat.

The above and other objects and advantageous features of the present invention will be made apparent from the following description made with reference to the accompanying drawings.

DESCRIPTION OF THE PREFERRED EMBODIMENTS

A preferred embodiment in accordance with the invention will be explained hereinbelow with reference to drawings.

Figure 1:
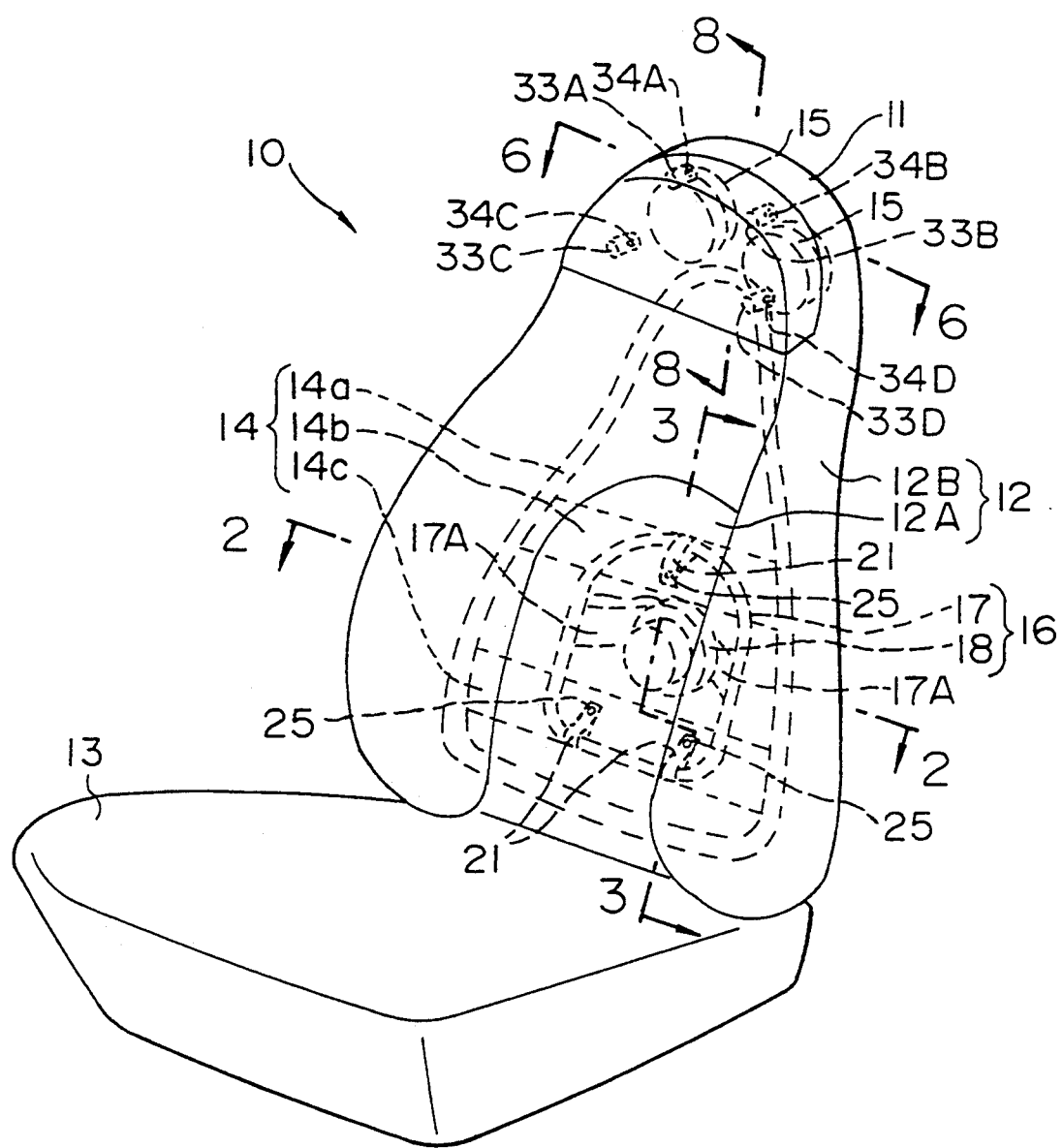
FIG. 1 is a perspective view illustrating a passenger's seat to which the support structure of the acoustic oscillation transferring device in accordance with the invention is applied.

FIG. 1 is a perspective view illustrating an embodiment of the support structure of the acoustic oscillation transferring device in accordance with the invention. A passenger's seat 10 comprises a headrest portion 11, a backrest portion 12 and a seat cushion portion 13. The seat 10 has a seat frame 14 contained therein across the headrest portion 11 and the backrest portion 12 for constituting a skeletal structure of the seat 10. The seat frame 14 comprises an outer frame 14a forming a closed loop across the headrest portion 11 and the backrest portion 12, and an upper inner frame 14b and a lower inner frame 14c each transversely extending in the outer frame 14a to connect to the outer frame 14a.

Figure 2:
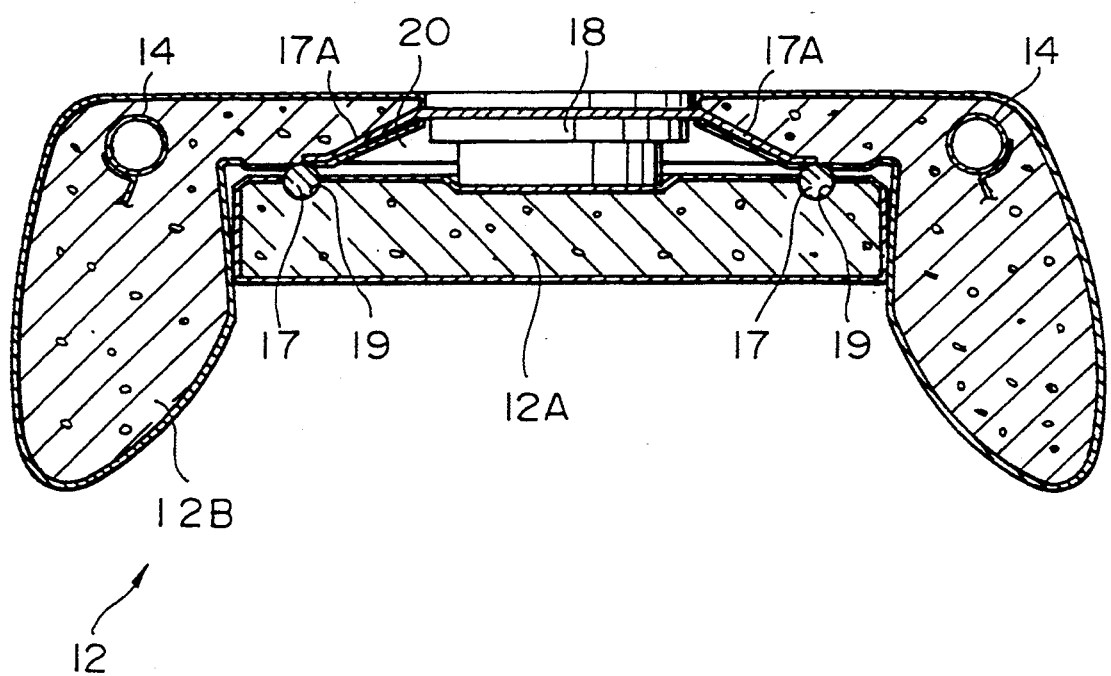
FIG. 2 is a cross-sectional view taken along the line 2—2 in FIG. 1.

As illustrated in FIG. 2, the backrest portion 12 includes a front cushion 12A and a rear cushion 12B aligned longitudinally of an automobile with and in close contact with the front cushion 12A. The seat frame 14 passes through the rear cushion 12B and is integral with the rear cushion 12B. The front cushion 12A is kept in close contact with the rear cushion 12B, but not fixedly bonded to the rear cushion 12B. Thus, the front and cushions 12A, 12B are supported for mutual movement through an acoustic oscillation transferring device 16 (explained later) so that the front cushion 12A can oscillate relative to the rear cushion 12B, as explained later.

A pair of pillow speakers 15 are varied in the headrest portion 11, and an acoustic oscillation transferring device 16 is varied in the backrest portion 12 so that the device 16 is located within the seat frame 14. The pillow speaker 15 is acoustically connected through a suitable transferring mechanism (not shown) to the acoustic oscillation transferring device 16 to send acoustic oscillation to the device 16. The acoustic oscillation transferring device 16 amplifies acoustic oscillation sent from the speaker 15 and sends the amplified oscillation to the front cushion 12A to oscillate the front cushion 12A. Thus, the acoustic oscillation transfers to a back of a passenger through the front cushion 12A to which the passenger's back abuts, and then the passenger can feel music represented by the acoustic oscillation through his or her body.

The acoustic oscillation transferring device 16 comprises an outer frame 17 in the form of a closed loop, a cylindrical amplifier 18 located approximately centrally of the loop 17, and a spoke 17A for connecting the amplifier 18 to the outer frame 17. As illustrated in FIG. 2, the outer frame 17 is fit into a groove 19 formed in the front cushion 12A at the interface of the front cushion 12A with the rear cushion 12B. The amplifier 18 is supported within an open space 20 provided in the rear front 12B.

Figure 3:
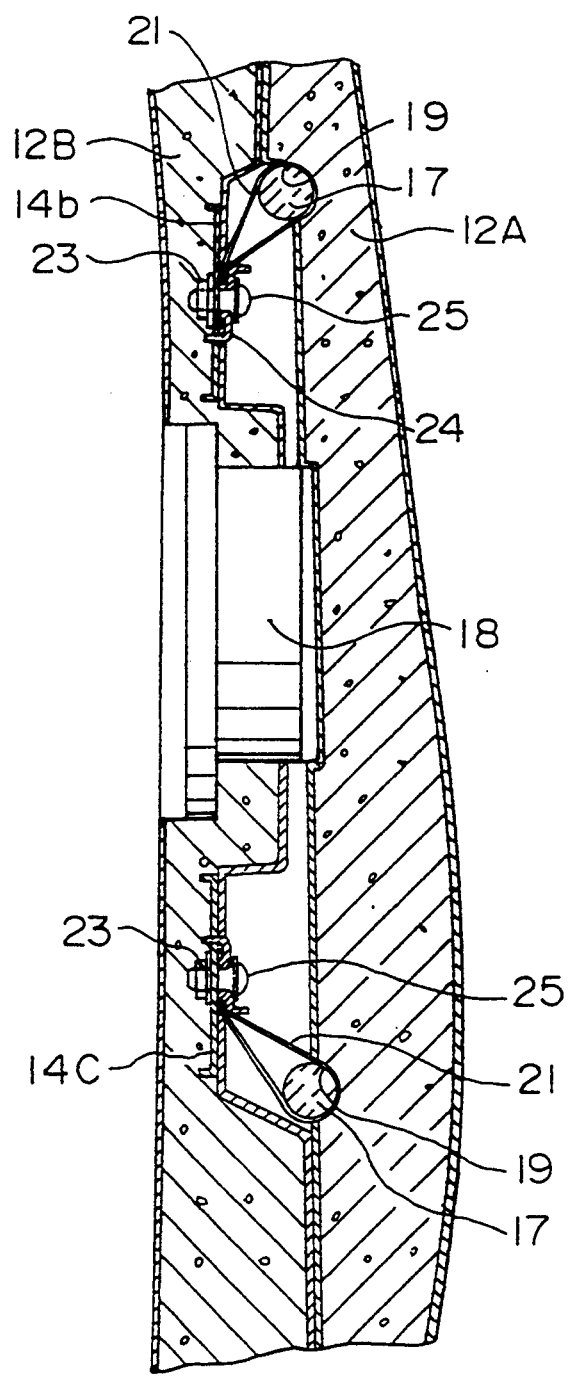
FIG. 3 is a cross-sectional view taken along the line 3—3 in FIG. 1.
Figure 4:
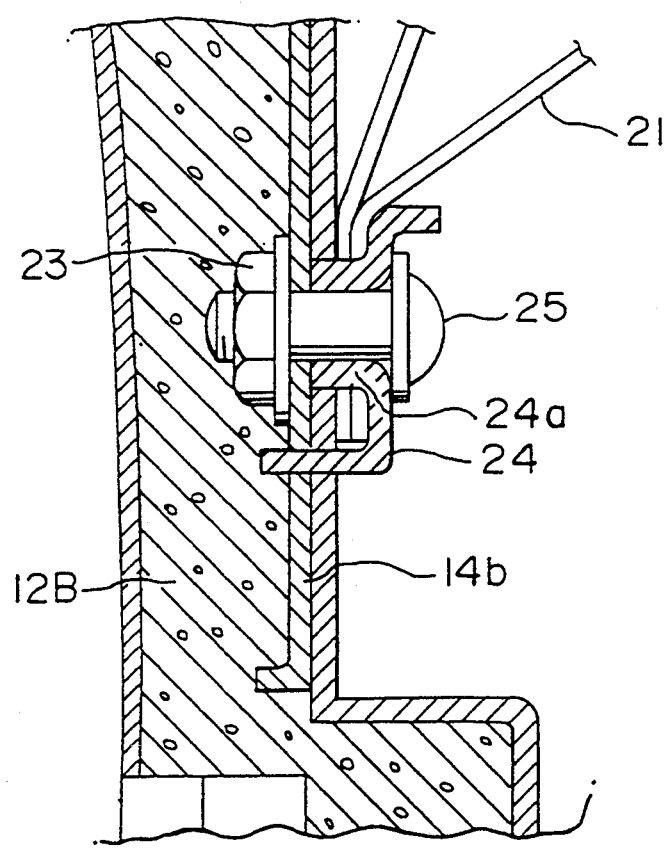
FIG. 4 is an enlarged view of a portion of FIG. 3.

As illustrated in FIGS. 3 and 4, the outer frame 17 of the acoustic oscillation transferring device 16 is secured to the upper inner frame 14b at one spot and to the lower inner frame 14c at two spots (see FIG. 1) each through a band material 21. Each of the inner frames 14b, 14c has a nut 23 attached thereto into which a bolt 25 is to be screwed with a spacer 24 being disposed between the nut 23 and the bolt 25. The band material 21 is in the form of a strip and has through holes (not shown) at opposite ends to insert the bolt 25 therethrough. In use, after the band material 21 is wrapped around the outer frame 17, a boss portion 24a of the spacer 24 is inserted into the band material 21 through the holes (not shown) formed at the opposite ends thereof. Then, after the bolt 25 is inserted into the boss portion 24a, the bolt 25 is screwed into the nut 23 secured to the inner frames 14b, 14c to thereby secure the band material 21 to the inner frames 14b, 14c.

The loop of the band material 21 is sized so that the outer frame 17 is disposed adjacent to the rear cushion 12B as illustrated in FIG. 3 or quite slightly apart from the rear cushion 12B, even if the front cushion 12A is caused to move away from the rear cushion 12A.

The band material 21 should not be stretchable because the band material 21 prevents the outer frame 17 from moving forward due to inertia force exerted on the seat 10. However, the band material 21 should be flexible because it needs to form a loop to be wrapped around the outer frame 17. That is, the band material 21 should be flexible, but not stretchable. Any material may be used to form the band material 21 if the material meets the aforementioned requirements. Materials suitable for forming the band material 21 includes, without limitation, woven yarn of synthetic fibers such as polyamide and polyester for use of a seat belt.

The cushions 12A, 12B are each covered with a skin (not shown) and are adapted not to separate by stitching up the skins with each other. In addition, the outer frame 17 is secured to the seat frame 14 through the band material 21. Accordingly, as aforementioned, the acoustic oscillation transferring device 16 comprising the outer frame 17 and the amplifier 18, together with the front cushion 12A moves for ward only slightly, even if the force exerts on the front cushion 12A.

Figure 5:
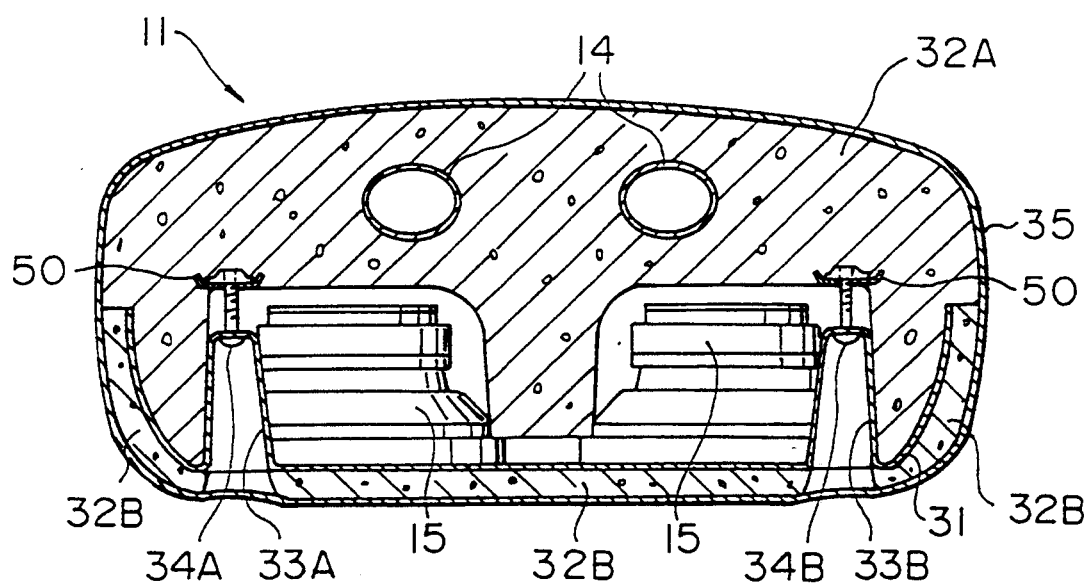
FIG. 5 is a horizontal cross-sectional view illustrating a conventional headrest portion.

This embodiment has other advantageous features than the aforementioned band material 21. As illustrated in FIG. 5, the pair of the pillow speakers 15 is secured to a plastic cover 31 in the headrest portion 11, and the speakers 15 together with the cover 31 is surrendered with cushion material 32A, 32B. The plastic cover 31 has four recesses 33A, 33B, 33C and 33D formed thereon (see FIG. 1. Only two are shown in FIG. 5.) at which the plastic cover 31 is secured through screws 34A, 34B, 34C and 34D to a frame 50 disposed in the headrest portion 11. The cover 31 is entirely covered with the cushion material 32A, 32B except the four recesses 33A, 33B, 33C and 33D into which no cushion material 32A, 32B is stuff. The cushion material 32A, 32B is covered with a skin 35. However, the skin 35 caves in at the recesses 33A, 33B, 33C and 33D resulting in deteriorating an appearance of the seat 10.

Figure 6:
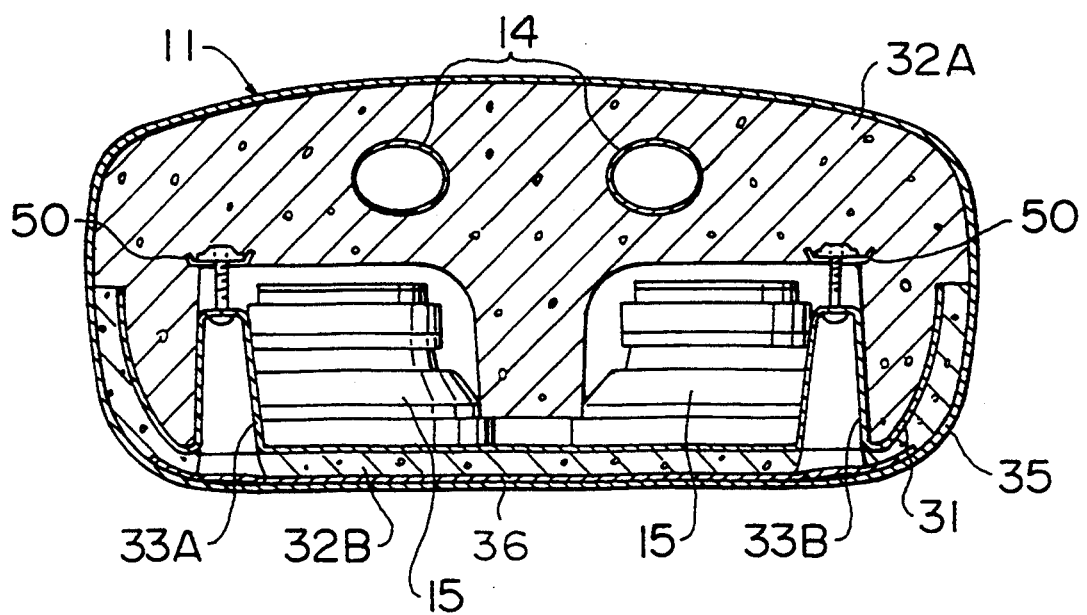
FIG. 6 is a cross-sectional view taken along the line 6—6 in FIG. 1.

To solve this problem, in this embodiment, as illustrated in FIG. 6, a sheet 36 made of polyvinyl chloride (PVC) is interposed between the cushion material 32B and the skin 35 at where the recesses 33A, 33B, 33C and 33D are disposed. Since the PVC sheet 36 is not likely to fall into the recesses 33A, 33B, 33C and 33D, wrinkles of the skin 35 do not tend to be generated along the periphery of the recesses resulting in preventing an appearance of the seat 10 from deteriorating.

The PVC sheet 36 may be just interposed between the cushion material 32B and the skin 35 without bonding to the cushion material 32B and/or the skin 35. Alternatively the PVC sheet 36 may be stitched in advance to the back side of the skin 35.

Figure 7:
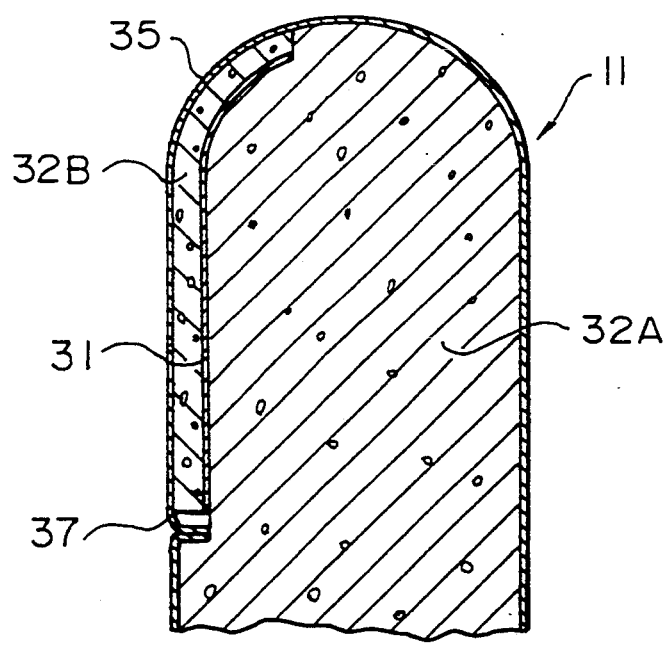
FIG. 7 is a vertical cross-sectional view illustrating a conventional head rest portion.

As illustrated in FIG. 7, if the cushion material 32B is designed to be equal in length to the cover 31, the skin 35 cannot adhere well to the cushion material 32B at its corner 37 resulting with wrinkles generated at the corner 37.

Figure 8:
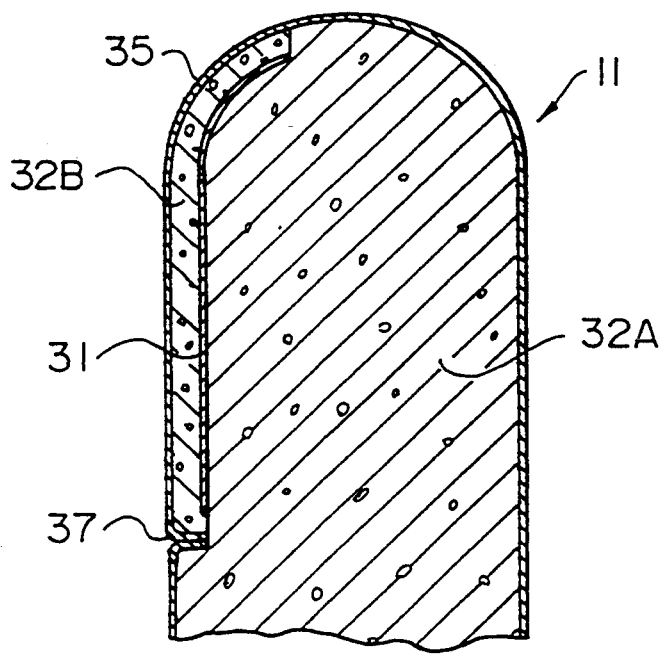
FIG. 8 is a cross-sectional view taken along the line 8—8 in FIG. 1.

To solve this problem, as illustrated in FIG. 8, the cushion material 32B is sized longer than the cover 31 and secured to the cover 31 as the cushion material 32B wraps around the lower end of the cover 31. This configuration makes the corner 37 of the cushion material 32B to be circular arc shaped, so that the skin 35 can adhere well to the cushion material 32B with the result that no wrinkles generate at the corner 37 of the cushion material 32B.

As explained with reference to the accompanying drawings, the acoustic oscillation transferring device in accordance with the invention is secured to the seat frame through the flexible but unstretchable band material. Accordingly, even if the device receives a collision force directing forward, the acoustic oscillation transferring device is restricted in its forward movement by means of the band material with the result of enhancement of safety.

In addition, since the acoustic oscillation transferring device is supported in the open space in the cushions, acoustic oscillation can be efficiently transferred to passengers.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A support structure for an acoustic oscillation transferring device used with a seat of an automobile comprising:
   a cushion, forming a part of the seat of the automobile, said cushion having an open space defined therein;
   a frame supporting the acoustic oscillation transferring device surrounding said open space;
   a seat frame, forming another part of the seat of the automobile; and
   an unstretchable but flexible band for securing said frame supporting the acoustic oscillation transferring device to said seat frame.

2. The support structure in accordance with claim 1, wherein said cushion is one of a front cushion and a rear cushion which together form a backrest portion of the seat, said front cushion and said rear cushion being kept in close contact with each other, said acoustic oscillation transferring device being secured to the front cushion.

3. The support structure in accordance with claim 2, wherein said frame supporting the acoustic oscillation transferring device is supported between said front cushion and said rear cushion.

4. The support structure in accordance with claim 2, wherein said band has opposite ends secured to the seat frame so that the band forms a loop around the frame supporting the acoustic oscillation transferring device.

5. The support structure in accordance with claim 4, wherein the loop is sized so that the front cushion is no more than slightly apart from the rear cushion.

6. The support structure in accordance with claim 1, wherein said band is made of woven yarn of synthetic fibers.

7. The support structure in accordance with claim 1, wherein said band has opposite ends secured to the seat frame so that the band forms a loop around the frame supporting the acoustic oscillation transferring device.

8. The support structure in accordance with claim 1, wherein said acoustic oscillation transferring device is disposed at the side of a driver's back.

9. A support structure for an acoustic oscillation transferring device used with a seat of an automobile comprising:
   a cushion, forming a part of the seat of the automobile, said cushion being one of a front cushion and a rear cushion separable from said front cushion, said acoustic oscillation transferring device being secured to the front cushion;
   a seat frame, forming another part of the seat of the automobile; and
   an unstretchable but flexible band for securing the acoustic oscillation transferring device to said seat frame, said acoustic oscillation transferring device is restricted in forward movement.

10. The support structure in accordance with claim 9, wherein said band has opposite ends secured to the seat frame so that the band material forms a loop which contains therein the acoustic oscillation transferring device.

* * * * *

UNITED STATES PATENT AND TRADEMARK OFFICE
CERTIFICATE OF CORRECTION

PATENT NO.: 5,387,026
DATED : February 7, 1995
INVENTOR(S): Kazuhiro MATSUHASHI, Koji TAKADA, Yoshikazu OKAMOTO It is certified that error appears in the above-identified patent and that said Letters Patent is hereby corrected as shown below:

On the title page, item [73], please add the following co-Assignee:

-- DELTA KOGYO CO., LTD.
Hiroshima, Japan --.

Signed and Sealed this

Twenty-seventh Day of February, 1996

*Attest:*

BRUCE LEHMAN

*Attesting Officer*   *Commissioner of Patents and Trademarks*